Oct. 21, 1941.  C. SUTTON  2,259,786
MECHANICAL DESK STAND FOR CYLINDRICAL SLIDE RULES
Filed Dec. 14, 1938   3 Sheets-Sheet 1

Inventor
Coleman Sutton

Oct. 21, 1941.   C. SUTTON   2,259,786
MECHANICAL DESK STAND FOR CYLINDRICAL SLIDE RULES
Filed Dec. 14, 1938   3 Sheets-Sheet 2

Inventor
Coleman Sutton

Oct. 21, 1941.  C. SUTTON  2,259,786

MECHANICAL DESK STAND FOR CYLINDRICAL SLIDE RULES

Filed Dec. 14, 1938  3 Sheets-Sheet 3

Inventor
Coleman Sutton

Patented Oct. 21, 1941

2,259,786

UNITED STATES PATENT OFFICE 2,259,786

MECHANICAL DESK STAND FOR CYLINDRICAL SLIDE RULES

Coleman Sutton, Alhambra, Calif.

Application December 14, 1938, Serial No. 245,662

10 Claims. (Cl. 235—79.5)

This invention relates to improvements in desk stands, and has for an object to provide a desk stand for the support of cylindrical slide rules of the type described in application Serial No. 125,875 filed February 15, 1937.

A further object is to provide a desk stand upon which such a cylindrical slide rule may be readily secured for operation in connection therewith.

A further object is to provide a desk stand from which the cylindrical slide rule may be readily removed for independent operation when desired, as when making or checking calculations on the slide rule in the field; or when the top of a desk, table, or similar flat surface may not be readily available; or under other circumstances in which it may be preferred to operate the slide rule independently of the desk stand.

A further object is to provide a desk stand such that the cylindrical slide rule can be conveniently and rapidly operated thereon with the right hand only, thus leaving the left hand of the operator free for other purposes, as for holding a telephone receiver, or for handling trigonometrical tables, etc. This permits the direct transfer of figures received over the telephone or selected from mathematical tables, or otherwise, to corresponding values upon the scales of the cylindrical slide rule with less likelihood of error and with a minimum loss of time. Thus the figures to be used may be selected from tables, maps, drawings, etc., and while being pointed out with the index finger of the left hand these figures can be transferred to the slide rule with the right hand only. All calculations can then be made with the right hand only, leaving the left hand free to retain the place in the mathematical table, or on the map, etc. Calculations can therefore be made on the cylindrical slide rule with the aid of the desk stand with less likelihood of error in transferring the figures to the slide rule, and with greater speed than has heretofore been customary in the operation of slide rules.

A further object is to provide a desk stand upon which the cylindrical slide rule can be releasably clamped in an operating position.

A further object is to provide means whereby the scale operating elements of the slide rule may be releasably and individually held in set positions.

A further object is to provide, in a preferred embodiment of my invention, a braking system especially devised to be operated by means of a single controlling element for each brake, which element may be similar to a typewriter key in appearance, and whereby: (1) the retarding action of a brake shoe may be either gradually or rapidly applied to a brake drum (such as a scale operating ring of the slide rule); (2) the brake shoe may be locked against the drum with sufficient pressure to prevent the drum from being easily turned, in order to hold the drum locked in stopped position; and (3) the brake shoe may be either gradually released from the drum or may be allowed to spring instantly into its fully released position. By providing a pair of brakes that can be either rapidly applied, locked, or instantaneously released as desired, by means of but a single controlling element for each brake, the slide rule can be operated upon the desk stand more rapidly and conveniently than can otherwise be done.

A further object is to provide, in a preferred embodiment of my invention, a brake in which the brake shoe can rotate slightly so as to insure its concentricity with the brake drum when the brake is set, thus automatically compelling the whole frictional braking surface of the brake shoe to come into contact with the brake drum.

A further object is to provide a desk stand such that a magnifying glass may be readily mounted and adjusted thereon to facilitate reading the scales of the slide rule.

With the foregoing and other objects in view the invention consists of certain novel details of construction and combinations of parts hereinafter fully described and claimed.

In the accompanying drawings forming part of this specification and illustrating a preferred embodiment of my invention:

Figures 1, 2:
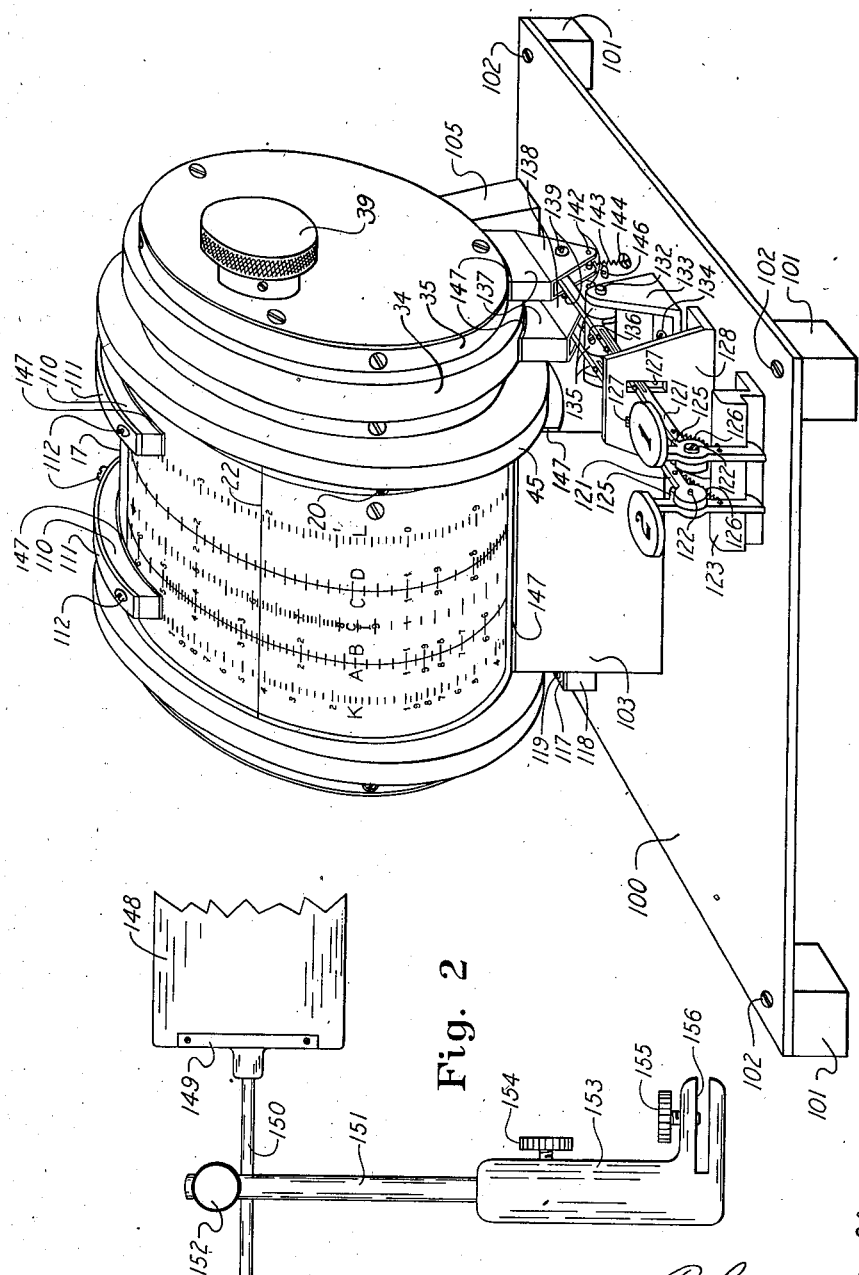
Figure 1 is a perspective view showing the slide rule secured in operating position upon the desk stand, with the keys for actuating the brake shoes shown in locked position.
Figure 2 is a front elevation of a portion of the magnifying glass held by a supporting standard and appurtenances.

Referring now to the drawings, in which like characters of reference designate similar parts in the various views, 100 designates a base supported upon pedestals 101 preferably four in number secured to said base by screws 102.

Figure 3:
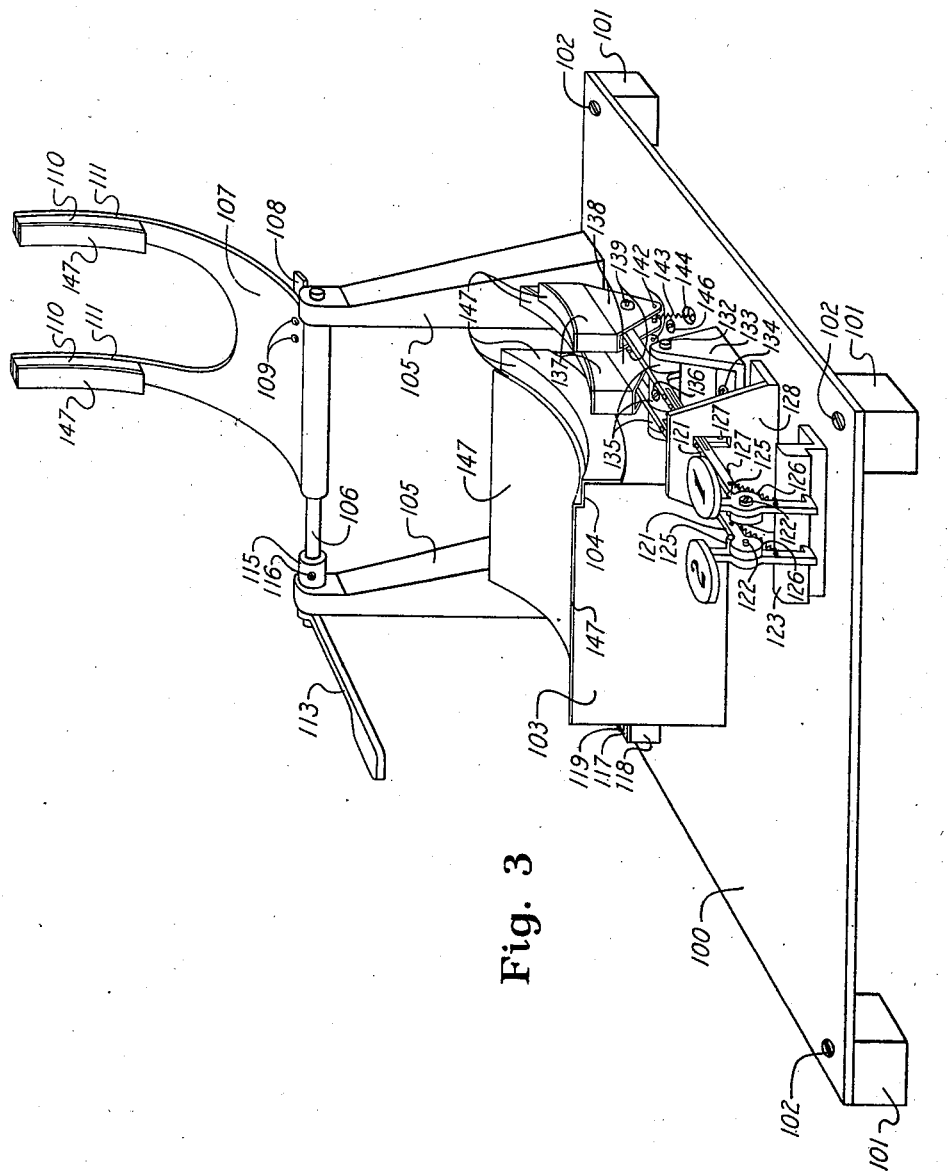
Figure 3 is a perspective view showing the desk stand with the slide rule removed therefrom, with the keys in released position, and with the clamp in open position.

A rectangular block 103, the upper surface of which forms a concave bed as shown in Fig. 3, is centrally located upon the said base 100 and is secured thereto by screws passed upward through the base and into the said block. The upper right-hand edge portion 104 of said block is recessed as shown to accommodate the screws 20 of the slide rule.

Two supporting standards 105, best shown in Fig. 3, are mounted upon the base 100 in rear of the rectangular block 103 and are likewise secured by screws passed upward through the base and into said supporting standards. A rotary shaft 106 is supported in bearings provided in the upper portions of said standards, as shown in Fig. 3. A curved clamp 107 is firmly secured to the shaft 106 by welding or otherwise. A short flat bar 108 is secured by rivets 109 to the back of said clamp and extends beyond the right-hand edge thereof. The outer portion of said bar 108 strikes against the upper rear portion of the right-hand supporting standard 105 when the clamp is opened, as shown in Fig. 3, and thereby stops the clamp from turning too far backward for convenience.

As best shown in Fig. 3, two arcuate shoes 110 are carried by respective arms 111 which comprise outwardly extending portions of the aforesaid clamp 107, said shoes being secured to said arms by screws 112 as shown in the closed position of said clamp illustrated in Fig. 1, there being preferably two of said screws securing each shoe.

Figure 4:
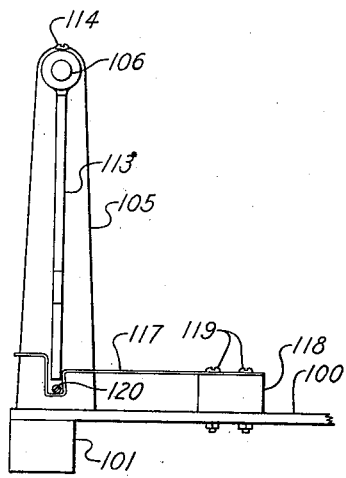
Figure 4 is a detail side elevation looking toward the left-hand side of the desk stand, showing the lever which controls the clamp held in its closed position by means of a spring catch.

A lever 113 having its free end portion widened to form a handle, is provided for turning the shaft 106 to swing the clamp 107 to its open or closed position. The open position of said lever is shown in Fig. 3, and its closed position is shown in Fig. 4. Said lever is secured to the shaft 106 by a screw 114 as shown in Fig. 4. A collar 115 is secured by a screw 116 to the shaft 106, as shown in Fig. 3, said collar being provided to prevent the shaft from slipping out of place longitudinally. The lever 113 may be returned to its locked position after the slide rule has been removed, in order to hold the clamp 107 and to diminish the amount of space occupied by the desk stand.

As shown in Fig. 4, the lever 113 is locked in its closed position by a leaf spring 117 supported upon a small rectangular block 118 mounted upon the aforesaid base 100, said block and said leaf spring being held in place by two bolts 119 passed through them and through the base 100. A screw 120 partially inserted into the standard 105, as shown in Fig. 4, limits the upward action of the leaf spring 117 and thereby prevents it from dangling loosely when the lever 113 is in its open position.

Although Fig. 4 illustrates a preferred arrangement for locking the lever controlling the clamp, it is to be understood that other means for releasably mounting the clamp 107, and that other forms of locking mechanisms or spring catches may be resorted to for this purpose, if desired, within the scope of the appended claims. In fact, in another embodiment of my invention I provide the clamp 107 mounted upon a vertical round rod adapted to be inserted into a short standard which may be attached to the base in rear of the concave bed, in lieu of the standards 105, the said vertical rod being releasably secured within its said supporting standard by means of a thumbscrew. In this case in order to release the clamp it is only necessary to unscrew the thumbscrew and lift the clamp, which may then be removed entirely with its supporting rod, or may be swung to the rear on the vertical axis of said rod.

For releasably and individually holding the scale operating elements of the slide rule in set positions, two keys designated 1 and 2 respectively are pivoted on the end of respective bars 121 by screw shafts 122. The lower end portions of said keys releasably hook into a recessed portion of an irregularly shaped member 123 mounted on the aforesaid base 100 by means of bolts 124 as shown in Fig. 5, there being preferably two of said bolts longitudinally disposed with respect to the said irregularly shaped member 123.

Protruding portions 125 formed on the aforesaid keys extend over the upper surfaces of their respective supporting bars 121 and thereby stop the keys from being rotated too far in that direction when being released. Coil springs 126 are connected between the keys and their respective bars 121 by hooking the ends of said coil springs in holes provided in the keys and in their respective bars, as shown.

Figure 5:
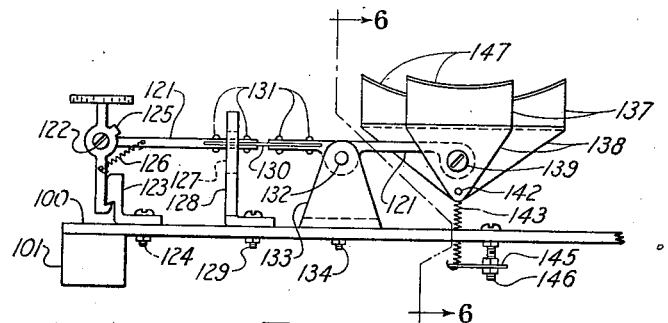
Figure 5 is a detail side elevation looking toward the right-hand side of the desk stand, showing the mechanism operating the brake shoes.

The bars 121 operate through vertical slots 127 provided in a bracket 128 mounted on the base 100 by means of bolts 129 shown in Fig. 5, there being preferably two of said bolts longitudinally disposed with respect to said bracket. The upper surfaces of the two slots 127 serve to stop their respective bars 121 and thereby prevent the keys from rising too high when released, as shown in Fig. 3.

In order that it may not be too difficult to push the keys down into their respective locked positions, the action of the bars 121 may be made slightly resilient by cutting them in two and inserting within each of them a leaf spring 130 secured by rivets 131 as best shown in Fig. 5. However, this may not be necessary if the parts are made with sufficient accuracy to give correct braking pressure without resilient action, or if the bars 121 are made of such size and material as to provide within themselves sufficient resiliency while retaining sufficient strength.

The said bars 121 are pivoted intermediate their ends upon a shaft 132 carried by a hinge 133 which is secured to the aforesaid base 100 by a bolt 134 as best shown in Figs. 1 and 3. Said bars 121 are confined in their respective positions upon the shaft 132 by three collars 135, the middle one of which is secured to the shaft 132 by a screw 136 to prevent the shaft from slipping out of place longitudinally.

Figure 6:
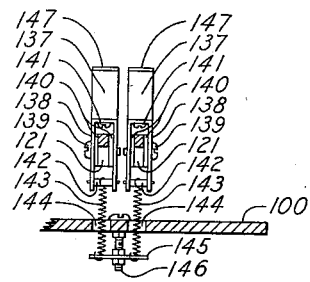
Figure 6 is a detail sectional view taken on the line 6—6 of Figure 5 showing parts in elevation.

As best shown in Figs. 5 and 6, two brake shoes 137 are pivoted upon the respective rear ends of the bars 121 by means of hinge lugs 138 which are mounted upon respective screw shafts 139 that pass through the rear end portions of the bars 121 and are free to turn therein, said screw shafts 139 being secured by threaded holes in the hinge lugs 138. The bars 121 are centrally confined within their respective hinge lugs 138 by washers 140 as shown in Fig. 6. The two brake shoes 137 are secured to their respective hinges 138 by screws 141 as shown in Fig. 6, there being preferably two of said screws securing each brake shoe. Two round spacer rods 142 having end portions of reduced diameter are held in holes provided in the lower portions of their respective hinge lugs 138 as best shown in Fig. 6, and prevent the hinge lugs from being drawn too close together and thereby binding against the rear end portions of their respective bars 121 when the screw shafts 139 are drawn tight.

Two coil springs 143, best shown in Fig. 6, are hooked over their respective spacer rods 142 and extend downward through respective holes 144 provided in the aforesaid base 100. The lower ends of said coil springs hook into respective holes provided in a plate 145 which is secured below the base 100 between two nuts on a bolt 146 as shown in Figs. 5 and 6. Said coil springs 143 exert outward radial tension on their respective hinge lugs 138, thereby keeping the arcuate surfaces of the brake shoes 137 substantially concentric with the scale operating rings of the slide rule, and impelling the instant release of said brake shoes from the operating rings of the slide rule when the aforesaid keys designated 1 and 2 respectively are unhooked.

It will be noted that the amount of tension in the coil springs 143, and hence the maximum amount of radial thrust that can be exerted by the brake shoes, may be increased or decreased by changing the set position of the plate 145 upon the bolt 146. As will be explained more fully hereinafter, the maximum amount of radial thrust that is exerted by the brake shoe actuated by key No. 2 must be somewhat more carefully controlled, as by the adjustable plate 145, than need be that exerted by the other brake shoe. By providing but one adjustable plate 145 for attaching both springs 143, the tension in both springs is automatically equalized regardless of the set position of said plate, thus at all times providing for a practically uniform pressure, or touch, necessary upon either key to actuate its brake shoe. However, nothing stated herein is to be construed as prohibiting the use of separate means for individually adjusting the tension in the two springs 143, should this be desired, within the scope of the appended claims, as by providing, for example, a separate bolt and adjustable plate for each spring.

In fact, in another embodiment of my invention I provide the two brake shoes suspended vertically in front of the scale operating rings of the slide rule, upon the free upper ends of individual leaf springs attached at their lower ends to the lower part of a standard mounted on the base of the desk stand, the top of said standard being at approximately the same height as the brake shoes. In this case I provide a hook on the upper portion of each leaf spring whereby each spring can be pulled back individually and hooked to the supporting standard to hold its brake shoe released from the slide rule. Thus in the operation of this embodiment of my invention the brake shoes are automatically actuated and held against the scale operating rings of the slide rule by means of respective leaf springs, and are released and held in released position by means of respective hooks attached to said leaf springs, said hooks being adapted to releasably snap into respective catches provided therefor upon a supporting standard mounted on the base of the desk stand.

In this said embodiment of my invention wherein the brake shoes are suspended vertically in front of the scale operating rings of the slide rule, the rectangular block 103 is not necessary to support the slide rule above horizontally suspended brake shoes, as illustrated. Hence, when the two brake shoes are vertically suspended, the rectangular block 103 may be dispensed with and the slide rule then clamped directly upon the base 100 by providing slots in said base to accommodate the lower portions of the operating rings of the slide rule, in which slots the scale operating rings of the slide rule are free to turn.

Since it has already been explained herein how means other than that illustrated may be provided for releasably mounting the clamp 107, and since the brake shoes may be suspended vertically by other means as well as horizontally as illustrated, and since the rectangular block 103 as illustrated may be entirely dispensed with in certain arrangements of the device, it is therefore thought to be impractical to attempt to describe and illustrate all of the possible arrangements and forms of the desk stand in detail herein, it being understood however that various modifications in the preferred embodiment as described and illustrated may be resorted to within the scope of the appended claims without departing from the spirit or sacrificing any of the advantages of the invention.

All surfaces of the desk stand, including the brake shoes, which come into direct contact with the slide rule are preferably lined with felt or other cushioning material 147 to prevent marring the instrument and to assist in holding it securely when in operation on the desk stand.

A magnifying glass 148, a portion of which is illustrated in Fig. 2, is secured by a bracket 149 to a horizontal round rod 150 which passes through a hole in the upper portion of a vertical round rod 151. Above the said hole, the vertical rod 151 is split vertically on a plane passing through the horizontal rod 150. A thumbscrew 152 passes at a right angle through the said split portion of the vertical rod 151 and when tightened clamps the said vertical and horizontal rods together.

The vertical rod 151 extends downward into a supporting standard 153 and is secured therein by a thumbscrew 154, as shown in Fig. 2. The lower portion of said supporting standard 153 constitutes a horizontal projecting portion thereof carrying a thumbscrew 155 extending through approximately the upper half of said projecting portion and into a slot 156 provided therein, as also shown in Fig. 2.

When use of the magnifying glass is desired, the supporting standard 153 is slipped over the left-hand edge portion of the aforementioned base 100 of the desk stand by means of the slot 156, and is clamped onto the said base at any preferred distance in front of the slide rule by means of the thumbscrew 155. A rubber tip may be provided on the lower end of said thumbscrew 155 to prevent it from marring the surface of the base 100, or other means can be employed for this purpose, if desired.

By loosening the thumbscrew 154, the magnifying glass may then be adjusted up or down, or turned on the vertical axis of the rod 151, and then held by retightening the thumbscrew 154. Then by loosening the thumbscrew 152 the magnifying glass may be adjusted horizontally to the right or to the left, or turned upon the horizontal axis of the rod 150, and then held by again tightening the thumbscrew 152. The magnifying glass is thus universally adjustable to suit the personal desire of the operator.

The right-hand portion of the magnifying glass is shown broken away in Fig. 2 for the sake of clarity in the drawings, the magnifying glass actually being of sufficient length to extend completely across all of the scales on the slide rule. The magnifying glass is preferably not framed, for a frame around the glass would obscure a portion of the scales on the slide rule. The slide rule may be placed upon or removed from the desk stand without disturbing the position of the magnifying glass thereon.

Use of the magnifying glass greatly facilitates reading the scales on the slide rule, but its use is not strictly necessary for the successful operation of the slide rule upon the desk stand. No claims therefore are appended hereto for the magnifying glass and its appurtenances, as illustrated in Fig. 2, for it is believed that such do not constitute a true combination with the desk stand and do not represent invention per se.

In order to operate the cylindrical slide rule upon the desk stand, the lever 113 is first unlocked by pushing down on the free end portion of the leaf spring 117 in rear of the lever, as shown in Fig. 4. The lever is then swung forward, opening the clamp 107, and the keys designated 1 and 2 respectively are released, as shown in Fig. 3.

The slide rule is then placed upon the desk stand with its transparent cover 17 resting in the aforementioned concave bed which forms the upper surface of the rectangular block 103, and is turned if necessary to bring one of the hair lines 22 to a convenient position for the operator. If the magnifying glass 148 is to be used, the hair line 22 should be set to appear at about the middle of the magnifying glass. The slide rule is then pushed gently toward the left until it is stopped by the flange 45 on its transparent cover striking the right-hand side of the bed. The clamp 107 is then closed by pushing down the lever 113 until said lever is automatically locked by the leaf spring 117 as shown in Fig. 4. The shoes 110 on the clamp are thereby closed tightly against the transparent cover 17 of the slide rule, as shown in Fig. 1, and the slide rule is then ready for operation.

With the slide rule clamped in position as described, the rotary transparent cover 17 thereon is no longer free to turn, and the hair line index 22 therefore remains fixed in its selected position. However, the three scale-bearing elements on the slide rule may be readily turned within the transparent cover by means of their external controlling elements at the right-hand end portion of the slide rule, and therefore any number or subdivision on any scale may be readily turned to coincidence with the hair line index. Since the operation of the slide rule also requires that a number or subdivision on one scale be brought into alignment on the hair line index with another number or subdivision on another scale, and since this is to be done with one hand only in this case, the hereinbefore described keys designated 1 and 2 respectively are provided to lock certain of the scales in position while others of the scales are being turned.

Thus if either one of the said keys be pushed downward it will cause its corresponding supporting bar 121 to turn upon the shaft 132 with resultant rise of the corresponding brake shoe 137 which thereupon frictionally engages the periphery of the corresponding controlling ring 34 or 35, as the case may be, of the slide rule, and thereby prevents the said ring from turning. Hence the relatively fixed scales on the slide rule may be locked in position by key No. 1, while with key No. 2 released, the rotary scales may be turned by means of the ring 34 or the knob 39. Likewise, the rotary scales may be locked by key No. 2, while with key No. 1 released, the fixed scales may be turned by means of the ring 35. And further, with both keys released, all of the scales may be turned at once by means of the ring 35.

It will be noted that the brake shoe actuated by key No. 2 extends over a greater length of circular arc than does that of the brake shoe actuated by key No. 1. This has been done in view of the fact that the ring 34 of the slide rule, which is to be stopped from turning by means of key No. 2, is suspended upon frictional rollers within the instrument, and, if too much upward pressure is exerted by the brake shoe in stopping the ring 34, this external upward pressure may overcome that of the frictional rollers within, with the result that the said ring 34 may be pushed upward and bind against the interior supporting cylinder of the slide rule, thereby stopping the entire slide rule from turning. By providing its brake shoe with a sufficiently large frictional surface however, the upward pressure of the brake shoe may be reduced, so that the ring 34 can be held in position without internal binding, thus permitting rotation of the relatively fixed scales while the rotary scales are held stationary by means of the brake shoe actuated by key No. 2. However, nothing stated herein is to be construed as restricting the relative size of either brake shoe, since the thrust thereof may also be regulated as hereinbefore described by adjusting the tension in the coil springs 143.

In order to lock either of the two keys and thereby set their brakes, it is only necessary to push the keys down, whereupon the coil springs 126 automatically snap them into their locked positions; and in order to release the keys it is only necessary to push against the near edge of their tops, thereby unhooking their lower ends, whereupon the coil springs 143 pull down the brake shoes and cause the keys to rise. Thus either key may be pushed down and locked with the thumb of the right hand, or if locked may be pushed against with the same thumb and released, in either case but very slightly removing the right hand from the controlling elements of the slide rule. Hence virtually no time is lost in the process of locking or releasing the keys, and with but little practice the operator can learn to do this without stopping to look at the keys.

It will here be noted that in the operation of the slide rule when detached from the desk stand, it is necessary for the operator to use both hands when he must hold the hair line index 22 from rotating while at the same time he must rotate the scales. In that case he must hold the flange 45 stationary with his right hand while he rotates the scales with his left hand by means of the flange at the left of the scales. When the slide rule is clamped on the desk stand however, use of the left hand is no longer necessary for this purpose, as the clamp 107 then prevents the hair line 22 from rotating, and the scales can then be rotated with the right hand only, as hereinbefore described. Thus the clamp 107 not only holds the entire slide rule in position for the brakes, but its action in holding the hair line index from automatically rotating when the scales are turned is necessary, together with the brakes, to accomplish the purpose of making possible the operation of the entire slide rule with the right hand only, which is an object of this invention as hereinbefore stated.

In the solution of mathematical problems the two relatively fixed scale-bearing elements of the slide rule may first be set on the hair line index and then locked by key No. 1, and while the fixed scales are thus being held the rotary scale-bearing element in the middle thereof may be turned to the required alignment of its numbers or subdivisions therewith, whereupon said key No. 1 may be released and all the scale-bearing elements turned together for a final reading or a new setting on the hair line index. Hence key No. 2 and the parts operated thereby may not always be considered strictly necessary and may not be provided, but may be provided for use in cases in which it may be thought more practical or desirable to first set and hold the rotary scales in position before setting the fixed scales.

It is believed that the key and brake shoe method described herein represents improvement in braking devices whereby a brake may be set, locked, and released more quickly and conveniently than has heretofore been customary in such devices. However, in this case the braking arrangement illustrated represents primarily a preferred embodiment of one of the features of my invention and may be modified if desired within the scope of the appended claims.

This completes the description of my invention from which it is thought that the construction and operation of the several embodiments thereof will be fully understood without further explanation.

The invention claimed is:

1. A clamp including a concave bed, a base supporting said concave bed, a pair of standards upon said base, a shaft supported by said standards, an arcuate member mounted upon said shaft between said standards, a portion of said shaft extending beyond one of said standards, and a handle on the extended portion of said shaft for rotating the shaft to open and close said clamp.

2. A brake including a base, a supporting member attached to said base, a bar pivoted on said supporting member, a key pivoted on said bar for actuating said brake, a portion of said key forming a hook, a catch on the aforesaid base for receiving said hook, and a spring connecting said key with the aforesaid bar for snapping said hook into said catch to hold said brake in set position.

3. A brake including a base, a supporting member attached to said base, a bar pivoted intermediate its ends on said supporting member, a key pivoted on an end portion of said bar for actuating said brake, a portion of said key forming a hook, a catch on the aforesaid base for receiving said hook, a spring connecting said key with the aforesaid bar for snapping said hook into said catch to hold said brake in set position, a brake shoe pivoted on the other end portion of the aforesaid bar, and a spring connecting said brake shoe to the aforesaid base for holding the brake shoe in inoperative position and to impel the release of said brake when the aforesaid key is unhooked.

4. A desk stand including a base, a concave bed upon said base, a pair of standards upon said base, a shaft supported by said standards, an arcuate member mounted upon said shaft between said standards, a portion of said shaft extending beyond one of said standards, a handle on the extended portion of said shaft for rotating the shaft to clamp the rotary cursor of a cylindrical slide rule upon the aforesaid concave bed by means of the aforesaid arcuate member and thereby prevent rotation of the said cursor, a supporting member attached to the aforesaid base, a bar pivoted intermediate its ends on said supporting member, a brake shoe pivoted on an end portion of said bar, said brake shoe being adapted to engage the aforesaid cylindrical slide rule in such manner as to prevent rotation of its relatively fixed scales when the aforesaid cursor of the said slide rule is clamped upon the aforesaid concave bed as hereinbefore described, a spring connecting the said brake shoe to the aforesaid base for holding the brake shoe in inoperative position and to impel the release of said brake shoe, a key pivoted on the other end portion of the aforesaid bar for actuating said brake shoe, a portion of said key forming a hook, a catch on the aforesaid base for receiving said hook, and a spring connecting said key with the aforesaid bar for snapping said hook into said catch to hold the aforesaid brake shoe in set position so that the aforesaid cylindrical slide rule can be operated with only one hand when clamped upon the desk stand herein claimed and in the manner hereinbefore described.

5. A desk stand including a clamp adapted to hold the cursor of a cylindrical slide rule in fixed position, a base supporting said clamp, and a brake mounted upon said base adapted to releasably hold a scale bearing element of said slide rule in set positions when the cursor of said slide rule is held in fixed position by the aforesaid clamp, so that the said slide rule can be operated with only one hand upon the desk stand herein claimed.

6. A brake including a brake drum having a cylindrical periphery, a brake shoe having an arcuate surface adapted to engage the periphery of said drum for applying said brake, and a lever pivotally supporting said brake shoe to allow said brake shoe to rotate sufficiently thereon to automatically insure concentricity between the arcuate surface of said brake shoe and the periphery of said brake drum when the aforesaid brake is applied.

7. A brake including a brake drum having a cylindrical periphery, a brake shoe having an arcuate surface adapted to engage the periphery of said drum for applying said brake, a lever pivotally supporting said brake shoe to allow said brake shoe to rotate sufficiently thereon to automatically insure concentricity between the arcuate surface of said brake shoe and the periphery of said brake drum when the aforesaid brake is applied, and a spring connected to said brake shoe adapted to hold the arcuate surface of said brake shoe substantially concentric with the periphery of said brake drum when the said brake is in inoperative position.

8. A brake including a brake drum having a cylindrical periphery, a brake shoe having an arcuate surface adapted to engage the periphery of said drum for applying said brake, a lever pivotally supporting said brake shoe to allow said brake shoe to rotate sufficiently thereon to automatically insure concentricity between the arcuate surface of said brake shoe and the periphery of said brake drum when the aforesaid brake is applied, a member pivotally supporting said lever, a base supporting said member, and an elastic connection between said base and said brake shoe for holding the arcuate surface of said brake shoe substantially concentric with the periphery of said brake drum when the said brake is in inoperative position.

9. A brake including a base, supporting members mounted upon said base, a brake drum having a cylindrical periphery rotatably supported by said supporting members, a pivotal member mounted upon said base, a lever pivoted on said pivotal member, and a brake shoe having an arcuate surface adapted to engage the periphery of said brake drum for applying said brake pivoted on said lever so as to rotate sufficiently thereon to automatically insure concentricity between the arcuate surface of said brake shoe and the periphery of said brake drum when the brake is applied.

10. A brake including a base, supporting members mounted upon said base, a brake drum having a cylindrical periphery rotatably supported by said supporting members, a pivotal member mounted upon said base, a lever pivoted on said pivotal member, a brake shoe having an arcuate surface adapted to engage the periphery of said brake drum for applying said brake pivoted on said lever so as to rotate sufficiently thereon to automatically insure concentricity between the arcuate surface of said brake shoe and the periphery of said brake drum when the brake is applied, and an elastic connection between said brake shoe and the aforesaid base for holding the arcuate surface of said brake shoe substantially concentric with the periphery of said brake drum when the said brake is in inoperative position.

COLEMAN SUTTON.